United States Patent
Feeley et al.

(10) Patent No.: US 7,606,382 B2
(45) Date of Patent: Oct. 20, 2009

(54) BTE/CIC AUDITORY DEVICE AND MODULAR CONNECTOR SYSTEM THEREFOR

(75) Inventors: Jim Feeley, Bixby, OK (US); Mike Feeley, Tulsa, OK (US)

(73) Assignee: Hear-Wear Technologies LLC, Tulsa, OK (US)

( * ) Notice: Subject to any disclaimer, the term of this patent is extended or adjusted under 35 U.S.C. 154(b) by 0 days.

(21) Appl. No.: 11/601,057

(22) Filed: Nov. 17, 2006

(65) Prior Publication Data

US 2007/0064966 A1      Mar. 22, 2007

Related U.S. Application Data

(63) Continuation of application No. 09/927,891, filed on Aug. 10, 2001, now Pat. No. 7,139,404.

(51) Int. Cl.
   *H04R 25/00* (2006.01)
(52) U.S. Cl. .................. 381/330; 381/322; 381/328
(58) Field of Classification Search ............. 381/312, 381/315, 322, 324, 328, 330, 380, 381, 382, 381/FOR. 132, FOR. 133, FOR. 135
   See application file for complete search history.

(56) References Cited

U.S. PATENT DOCUMENTS

| | | | |
|---|---|---|---|
| 675,700 A | 6/1901 | Zimmerman |
| 1,587,643 A | 6/1926 | Harman |
| 1,630,028 A | 5/1927 | Reynolds |
| 1,753,817 A | 4/1930 | Aber |
| 1,908,850 A | 5/1933 | Kinsley |
| 1,952,577 A | 3/1934 | Bennett |
| 1,973,410 A | 9/1934 | Greibach |
| 2,430,229 A | 11/1947 | Kelsey |
| 2,445,425 A | 7/1948 | Gabbert |
| 2,474,135 A | 6/1949 | White |
| 2,487,038 A | 11/1949 | Baum |
| RE23,203 E | 3/1950 | Posen |

(Continued)

FOREIGN PATENT DOCUMENTS

CH          664057          1/1988

(Continued)

OTHER PUBLICATIONS

PCT International Search Report in PCT/US03/26849 dated Jan. 22, 2004.

(Continued)

*Primary Examiner*—Brian Ensey
(74) *Attorney, Agent, or Firm*—Fulbright & Jaworski L.L.P.

(57) ABSTRACT

An earpiece auditory device is described which includes a behind-the-ear component shaped to fit behind the ear of a user. The behind-the-ear component can also have at least one microphone and processing circuitry, where the processing-circuitry is used to processes audio signal from the microphone. The device also includes a speaker sized to fit in the ear canal of a user, and an ear mold holding the speaker in place. The ear mold can also be position to touch the bony portion of the ear canal and provide sound attenuation in the ear canal. A connector physically and electrically connects the behind-the-ear component to the speaker. The connector is capable of being used to insert and remove the speaker and ear mold from the ear canal of the user.

6 Claims, 4 Drawing Sheets

U.S. PATENT DOCUMENTS

| | | |
|---|---|---|
| 2,506,981 A | 5/1950 | Weaver |
| 2,513,746 A | 7/1950 | Rohr |
| 2,584,896 A | 2/1952 | Maffris |
| 2,641,327 A | 6/1953 | Balmer |
| 2,696,527 A | 12/1954 | Watson |
| D178,620 S | 8/1956 | Trieise |
| 2,856,466 A | 10/1958 | Gustafson |
| 2,882,348 A | 4/1959 | Erickson |
| D185,740 S | 7/1959 | Criswell |
| 2,930,856 A | 3/1960 | Toht |
| D187,988 S | 5/1960 | Olson |
| 2,938,083 A | 5/1960 | Herrmann |
| 2,939,923 A | 6/1960 | Henderson |
| 2,975,244 A | 3/1961 | Lehr |
| 3,031,537 A | 4/1962 | Rose |
| 3,045,073 A | 7/1962 | Vickerson |
| 3,061,389 A | 10/1962 | Bargmann |
| 3,061,689 A | 10/1962 | McCarrell |
| 3,068,954 A | 12/1962 | Strzalkowski |
| 3,076,061 A | 1/1963 | Thompson |
| 3,076,062 A | 1/1963 | Fener |
| 3,080,011 A | 3/1963 | Henderson |
| 3,098,127 A | 7/1963 | Huth |
| 3,101,155 A | 8/1963 | Lehr |
| 3,102,172 A | 8/1963 | Cohen |
| 3,123,678 A | 3/1964 | Prentiss et al. |
| 3,126,977 A | 3/1964 | McGee |
| D199,125 S | 9/1964 | Flygstad |
| 3,170,046 A | 2/1965 | Leale |
| 3,193,048 A | 7/1965 | Kohler |
| 3,197,576 A | 7/1965 | Martin |
| 3,209,080 A | 9/1965 | Guttner |
| 3,209,082 A | 9/1965 | McCarrell |
| RE26,174 E | 3/1967 | Leale |
| 3,312,789 A | 4/1967 | Lewis |
| RE26,258 E | 8/1967 | Martin |
| 3,368,644 A | 2/1968 | Henderson |
| 3,385,937 A | 5/1968 | Lafon |
| 3,408,461 A | 10/1968 | Langford |
| 3,414,685 A | 12/1968 | Geib |
| 3,439,128 A | 4/1969 | Sobel |
| 3,458,668 A | 7/1969 | Hassler |
| 3,470,328 A | 9/1969 | Daniels |
| 3,513,269 A | 5/1970 | Wilson |
| 3,524,951 A | 8/1970 | Bernardi |
| 3,527,901 A | 9/1970 | Geib |
| 3,536,861 A | 10/1970 | Dunlavy |
| 3,665,121 A | 5/1972 | Weiss |
| 3,676,611 A | 7/1972 | Stephens |
| 3,688,863 A | 9/1972 | Johnson |
| 3,783,201 A | 1/1974 | Weiss et al. |
| 3,784,750 A | 1/1974 | Stearns et al. |
| 3,828,142 A | 8/1974 | Buttner et al. |
| 3,880,474 A | 4/1975 | Glicksberg |
| 3,890,474 A | 6/1975 | Glicksberg |
| 3,927,279 A | 12/1975 | Nakamura et al. |
| 3,934,100 A | 1/1976 | Harada |
| 4,006,321 A | 2/1977 | Carlson |
| 4,041,251 A | 8/1977 | Kaanders et al. |
| 4,068,090 A | 1/1978 | Komatsu et al. |
| 4,069,400 A | 1/1978 | Johanson et al. |
| 4,089,332 A | 5/1978 | Rose |
| 4,090,040 A | 5/1978 | Berland et al. |
| 4,099,035 A | 7/1978 | Yanick |
| 4,133,984 A | 1/1979 | Akiyama et al. |
| D251,234 S | 3/1979 | Hakansson |
| 4,259,547 A | 3/1981 | Valley et al. |
| 4,291,203 A | 9/1981 | Bellafiore |
| 4,303,120 A | 12/1981 | Carini |
| 4,311,206 A | 1/1982 | Johnson |
| 4,335,281 A | 6/1982 | Scott et al. |
| 4,354,065 A | 10/1982 | Buettner et al. |
| 4,366,349 A | 12/1982 | Adelman |
| 4,375,016 A | 2/1983 | Harada |
| 4,381,830 A | 5/1983 | Jelonek et al. |
| 4,418,787 A | 12/1983 | Eggert et al. |
| D272,904 S | 3/1984 | Kawano et al. |
| 4,451,709 A | 5/1984 | Waxman |
| 4,456,795 A | 6/1984 | Saito |
| 4,472,603 A | 9/1984 | Berg |
| 4,476,353 A | 10/1984 | Haertl et al. |
| 4,484,345 A | 11/1984 | Stearns |
| 4,508,940 A | 4/1985 | Steeger et al. |
| 4,520,236 A | 5/1985 | Gauthier |
| 4,539,440 A | 9/1985 | Sciarra |
| 4,584,437 A | 4/1986 | Giannetti et al. |
| 4,585,089 A | 4/1986 | Topholm et al. |
| 4,606,329 A | 8/1986 | Hough |
| 4,622,440 A | 11/1986 | Slavin |
| 4,622,692 A | 11/1986 | Cole et al. |
| 4,628,527 A | 12/1986 | Henneberger et al. |
| 4,628,907 A | 12/1986 | Epley |
| 4,638,125 A | 1/1987 | Buettner et al. |
| 4,677,679 A | 6/1987 | Killion |
| 4,689,819 A | 8/1987 | Killion |
| 4,710,961 A | 12/1987 | Buttner et al. |
| 4,727,582 A | 2/1988 | de Vries et al. |
| D294,862 S | 3/1988 | Diefenbach et al. |
| 4,739,512 A | 4/1988 | Hartl et al. |
| 4,783,816 A | 11/1988 | Buttner et al. |
| 4,803,732 A | 2/1989 | Dillon et al. |
| 4,817,609 A | 4/1989 | Perkins et al. |
| 4,821,247 A | 4/1989 | Grooms |
| 4,870,688 A | 9/1989 | Voroba et al. |
| 4,887,299 A | 12/1989 | Cummins et al. |
| 4,893,344 A | 1/1990 | Tragardh et al. |
| 4,912,769 A | 3/1990 | Erbe et al. |
| 4,962,537 A | 10/1990 | Basel et al. |
| 4,965,831 A | 10/1990 | Schmid et al. |
| 4,980,928 A | 1/1991 | Ellis et al. |
| 5,002,151 A | 3/1991 | Oliveira et al. |
| 5,008,058 A | 4/1991 | Henneberger et al. |
| 5,031,219 A | 7/1991 | Ward et al. |
| 5,046,580 A | 9/1991 | Barton |
| D322,481 S | 12/1991 | van Mourik et al |
| 5,091,952 A | 2/1992 | Williamson et al. |
| 5,195,139 A | 3/1993 | Gauthier |
| 5,201,007 A | 4/1993 | Ward et al. |
| 5,265,168 A | 11/1993 | Schiess et al. |
| 5,341,433 A | 8/1994 | Meyer et al. |
| 5,357,576 A | 10/1994 | Arndt et al. |
| D354,568 S | 1/1995 | Araki et al. |
| 5,381,484 A | 1/1995 | Claes et al. |
| 5,390,254 A | 2/1995 | Adelman |
| 5,395,168 A | 3/1995 | Leenen et al. |
| 5,408,534 A | 4/1995 | Lenzini et al. |
| 5,533,130 A | 7/1996 | Staton |
| 5,606,621 A | 2/1997 | Reiter et al. |
| D385,036 S | 10/1997 | Nielsen et al. |
| 5,675,657 A | 10/1997 | Giannetti et al. |
| 5,694,475 A | 12/1997 | Boyden |
| 5,701,348 A | 12/1997 | Shennib et al. |
| 5,708,720 A | 1/1998 | Meyer et al. |
| 5,717,771 A | 2/1998 | Sauer et al. |
| 5,721,783 A | 2/1998 | Anderson |
| 5,737,436 A | 4/1998 | Boyden |
| 5,757,935 A | 5/1998 | Kang et al. |
| 5,812,680 A | 9/1998 | Glendon |
| 5,861,779 A | 1/1999 | Loeppert et al. |
| 5,881,159 A | 3/1999 | Aceti et al. |
| 5,887,070 A | 3/1999 | Iseberg et al. |
| D411,885 S | 7/1999 | Mavrakis et al. |
| 5,920,636 A | 7/1999 | Oliveira et al. |
| 5,960,093 A | 9/1999 | Miller |

| | | | |
|---|---|---|---|
| 5,961,443 A | 10/1999 | Rastatter et al. | |
| 5,979,589 A | 11/1999 | Aceti | |
| 5,987,146 A | 11/1999 | Pluvinage et al. | |
| 6,009,183 A | 12/1999 | Taenzer et al. | |
| 6,021,207 A | 2/2000 | Puthuff et al. | |
| 6,041,129 A | 3/2000 | Adelman | |
| 6,055,566 A * | 4/2000 | Kikinis | 709/219 |
| 6,101,259 A | 8/2000 | Rapps | |
| 6,144,748 A * | 11/2000 | Kerns | 381/312 |
| 6,181,801 B1 | 1/2001 | Puthuff et al. | |
| 6,275,596 B1 | 8/2001 | Fretz et al. | |
| 6,339,648 B1 | 1/2002 | McIntosh et al. | |
| D457,635 S | 5/2002 | Dittli et al. | |
| 6,445,799 B1 | 9/2002 | Taenzer et al. | |
| 6,445,805 B1 | 9/2002 | Grugel | |
| 6,560,468 B1 | 5/2003 | Boesen | |
| 6,643,378 B2 | 11/2003 | Schumaier | |
| 6,704,423 B2 | 3/2004 | Anderson et al. | |
| 6,801,629 B2 | 10/2004 | Brimhall et al. | |
| 6,865,279 B2 | 3/2005 | Leedom | |
| 6,882,893 B2 | 4/2005 | Uchida et al. | |
| 7,016,512 B1 | 3/2006 | Feeley | |
| 7,110,562 B1 | 9/2006 | Feeley | |
| 7,139,404 B2 | 11/2006 | Feeley et al. | |
| 7,227,968 B2 | 6/2007 | van Halteren et al. | |
| 2002/0019658 A1 | 2/2002 | Munshi | |
| 2002/0080979 A1 | 6/2002 | Brimhall et al. | |
| 2002/0138237 A1 | 9/2002 | Topholm | |
| 2003/0002700 A1 | 1/2003 | Fretz et al. | |
| 2004/0010181 A1 | 1/2004 | Feeley et al. | |

FOREIGN PATENT DOCUMENTS

| | | |
|---|---|---|
| DE | 35 02 178 | 8/1985 |
| DE | 35 08 830 | 9/1986 |
| DE | 3601440 | 7/1987 |
| DE | 3638747 | 10/1987 |
| DE | 3625891 | 2/1988 |
| DE | 29801567 | 4/1998 |
| EP | 0 158 391 | 10/1985 |
| EP | 0 288 822 | 11/1988 |
| EP | 0 695 108 | 1/1996 |
| FR | 2058156 | 5/1971 |
| GB | 792742 | 4/1958 |
| JP | 62/1987-15110 | 7/1987 |
| WO | WO/92/13430 | 8/1992 |
| WO | WO/99/07182 | 2/1999 |
| WO | WO 99/07182 | * 11/1999 |
| WO | WO 00/01199 | 1/2000 |
| WO | WO/00/42817 | 7/2000 |
| WO | PCT/US2002/024960 | 2/2003 |
| WO | PCT/US2003/026849 | 3/2004 |

OTHER PUBLICATIONS

Mueller, H. Gustav; "CIC Hearing Aids: What Is Their Impact on the Occlusion Effect?" The Hearing Journal, vol. 47, No. 11 (Nov. 1994), pp. 29-35.
Ross, Mark and Raymond Cirmo; "Reducing Feedback in a Post-Auricular Hearing Aid by Implanting the Receiver in an Earmold," The Volta Review (Jan. 1980), pp. 40-44.
Vass, MS, William K. and Laura A. Mims, MS: "Exploring the Deep Canal Fitting Advantage:" Hearing Instruments; vol. 44, No. 12 (1003), pp. 26-27.
Webster's Ninth New Collegiate Dictionary, 1990, p. 392.
PCT Search Report for Application No. PCT/US96/007910 (Sep. 26, 1996).
PCT Search Report (PCT/US02/024960) dated Mar. 18, 2003.
European Examination Report issued for EP 02 752 712.6 dated Aug. 31, 2006.
U.S. Appl. No. 11/376,912, filed Mar. 16, 2006.
U.S. Appl. No. 10/238,829, filed Sep. 10, 2002.
Request for Ex Parte Reexamination of U.S. Patent 5,606,621 and Form SB-08 filed Dec. 31, 2007.
Request for Inter Partes Reexamination of U.S. Patent 7,139,404 and Form SB-08 filed Dec. 31, 2007.
Request for Inter Partes Reexamination of U.S. Patent 7,110,562 and Form SB-08 filed Dec. 31, 2007.
Request for Inter Partes Reexamination of U.S. Patent 7,016,512 and Form SB-08 filed Dec. 31, 2007.
The Extended European Search Report issued for European Patent Application No. 08075777.6-1224; dated Dec. 30, 2008, 5 pages.
PCT Search Report for Application No. PCT/US96/07910 (Jun. 14, 1995).

* cited by examiner

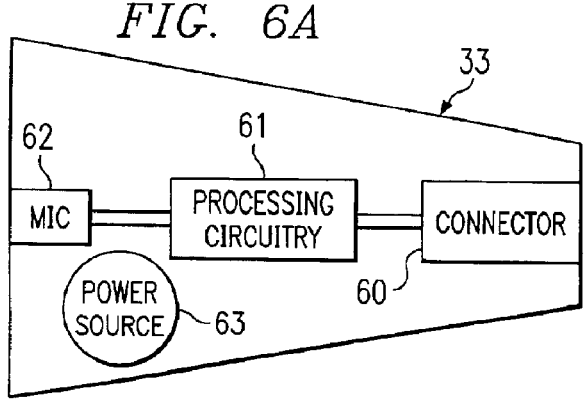
FIG. 6A
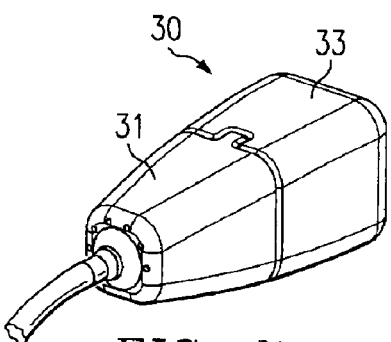
FIG. 7
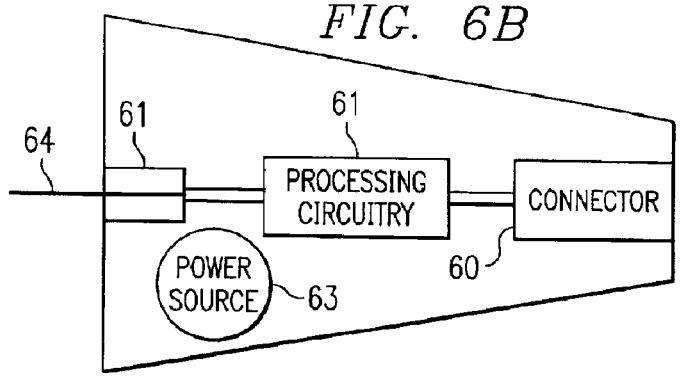
FIG. 6B
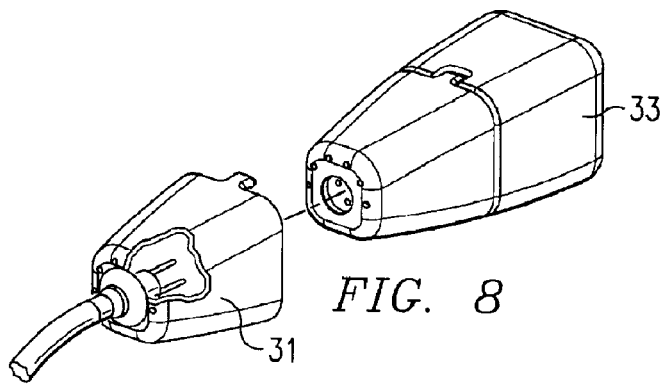
FIG. 8
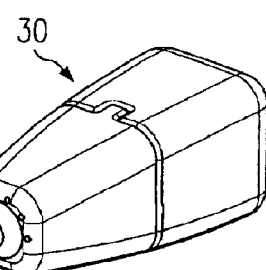
FIG. 9
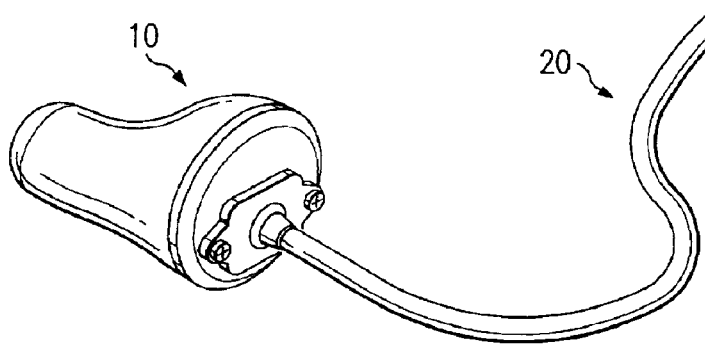

BTE/CIC AUDITORY DEVICE AND MODULAR CONNECTOR SYSTEM THEREFOR

CROSS-REFERENCE TO RELATED APPLICATIONS

This application is a Continuation claiming priority benefit of co-pending and commonly assigned U.S. patent application Ser. No. 09/927,891 entitled "A BTE/CIC AUDITORY DEVICE AND MODULAR CONNECTOR SYSTEM THEREFOR," filed Aug. 10, 2001, the disclosure of which is hereby incorporated herein by reference.

TECHNICAL FIELD

This invention relates generally to auditory devices, and in one aspect to a behind-the-ear (BTE)/completely-in-canal (CIC) auditory device and a modular connector system therefor.

BACKGROUND OF THE INVENTION

Conventional earpiece auditory devices (e.g., earphones, headphones, headsets, monitors, IFB devices, hearing aids, earplugs, etc.) are often bulky and uncomfortable for a user to wear. In addition, typically, these devices are cosmetically undesirable. For example, generally, use of one of these conventional devices may be easily discovered through casual observation of the user. However, in some circumstances, users may not want others to know they are using an earpiece auditory device. For example, oftentimes hearing aid users do not want others to know they are using such devices. As another example, news anchors using IFB devices may not want the device to be seen on camera. Moreover, use of a bulky and noticeable earpiece auditory device may potentially have more serious consequences. For example, a bulky, noticeable earpiece auditory device may put plain-clothed security personnel at risk of being discovered.

To overcome these problems, earpiece auditory devices have been developed wherein the entire device may be placed behind the ear of the user or within the ear of the user. However such devices, although possibly reducing some of the conspicuousness of the device, create their own set of problems.

For example, placing an auditory device within the outer portion of an ear canal of a user may cause the user to experience the occlusion effect, which is a plugged sensation that results when the ear canal is blocked and air conduction is impeded by the introduction of at least a portion of an earpiece auditory device into the outer portion of the ear canal. The ear canal (sometimes referred to as the external auditory meatus) has two zones: an outer zone and an inner zone. The outer zone, sometimes referred to as the cartilaginous region, makes up approximately two-thirds of the total length of the ear canal. The inner zone, referred to as the bony portion, accounts for the remaining one third of the length of the ear canal. The earlier mentioned plugged sensation is the result of the acoustic energy created by the vibration of the walls of the outer portion of the ear canal in response to a bone conducted signal. H. Gustav Mueller, "CIC Hearing Aids" What Is Their Impact On The Occlusion Effect?", *The Hearing Journal*, Vol. 47, No. 11, p. 29-35 (November 1994). This energy typically escapes when the ear canal is at least partially open. However, unfortunately, when an earpiece auditory device of sufficient size is placed in the outer portion of the ear canal, at least a portion of this energy is trapped in the user's ear, thereby causing the above described plugged sensation. In some existing earpiece auditory devices, a vent(s) or other means whereby bone-conducted energy may escape the ear canal is provided (e.g., the device is designed to leave the ear canal at least partially open), thereby minimizing or even eliminating the occlusion effect.

In addition, certain of the existing earpiece auditory devices (of both the behind the ear and within the ear or ear canal varieties) experience feedback problems. For example, some conventional earpiece auditory devices are designed with a microphone and speaker mounted to the same housing. As a result of such a design, the microphone and speaker are mechanically coupled to each other. One notably undesirable consequence of this mechanical coupling is electroacoustic feedback. Furthermore, in some conventional earpiece auditory devices, irrespective of the mounting of such components, a microphone and speaker of the device are situated in such close proximity to each other that feedback occurs. The above discussed feedback problems increase as the gain of the auditory device increases. As a result, the gain of such auditory devices are limited by the electroacoustic feedback.

In the past, efforts have been made to reduce such electroacoustic feedback by, e.g., physically separating the microphone and the speaker used in such devices. For example, *The Volta Review* January 1980, pp. 40-44, describes a hearing aid in which the receiver is separated from the main body of the aid and mounted in an ear mold that in turn is placed in the user's ear.

While such a design may result in reduced electroacoustic feedback, it would be commercially unacceptable. One reason for this is, similar to earlier discussions, the user will experience the occlusion effect on account of the introduction of the earmold into the outer portion of the user's ear canal.

In addition to the above, existing earpiece auditory devices are typically designed such that the electrical components of the device (e.g, the speaker, receiver, microphone, etc., or whichever of such components are included in the particular device) are coupled to each other via some fixed connection. For example, in at least one instance, a speaker of an earpiece auditory device is electrically coupled (either directly or indirectly) to a microphone, processing circuitry, and/or a transceiver of a device via some form of fixed wiring. Such fixed wiring is typically done because of the protection from moisture or other undesirable elements that such fixed wiring normally provides to electrical couplings. In addition, fixed wiring is used because it occupies little of the scarce device space.

However, as a result of such fixed couplings, assembly of the devices and/or replacement of defective or expired parts is normally costly, time-consuming, and/or burdensome. To illustrate, currently, when some element of an earpiece auditory device needs to be replaced (e.g., a part has expired or is defective), in most circumstances, the user must return the device to the manufacturer or send the device to a repair lab. Moreover, in some circumstances, at the manufacturer or the repair lab, the device must be taken apart, the defective or expired part(s) carefully removed, and a replacement part or parts inserted into the device and fixed (e.g., soldered) into place. Under such a process, it is usually several days or weeks before the auditory device is returned to the user.

In addition, for some earpiece auditory devices (e.g., some hearing aids, some ear plugs), at least a portion of the earpiece auditory device is normally manufactured to the specific dimensions of a particular user's ear structure and/or the user's intended use for the earpiece auditory device, as determined during a fitting of the user by a technician, representative, salesperson, etc. Although there are some advantages to this procedure (e.g., providing a desired fit to a particular user), one notable disadvantage to customizing these devices in this manner, at least to a manufacturer, is that such devices can then not be mass produced.

Furthermore, another disadvantage of this customizing of portions of earpiece auditory devices to a particular customer's ear shape is that if, upon delivery to the user, it is discovered that the fit of the auditory device is deficient in some manner, as was the case with replacing defective or expired parts, replacement of the ill-fitting earpiece is costly, time-consuming, and burdensome.

BRIEF SUMMARY OF THE INVENTION

The present invention is directed to an inventive earpiece auditory device. In one embodiment, the earpiece auditory device includes a behind-the-ear component, the behind-the-ear component preferably being shaped to fit behind an ear of a user. In some embodiments, the behind-the-ear component includes a module that includes processing circuitry. In a preferred embodiment, the earpiece auditory device also includes a completely-in-canal component, the completely-in-canal component preferably being shaped to fit into the ear canal of the user in such a manner as to touch the bony portion of the ear canal of the user. In some embodiments, the completely-in-canal component includes an ear mold. Moreover, in one embodiment, the earpiece auditory device includes a connector physically coupling the behind-the-ear component to the completely-in-canal component. In a preferred embodiment, the connector includes at least one end detachably coupled to the behind-the-ear component or the completely-in-canal component.

One technical advantage of a preferred embodiment of the present invention is ease of assembly, disassembly, reassembly, and/or the like, for an earpiece auditory device that reduces feedback, as well as the occlusion effect.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, and the advantages thereof, reference is made to the following descriptions taken in conjunction with the accompanying drawing, in which:

FIG. 6A depicts an exemplary embodiment of at least a portion of the elements of a processing module;

FIG. 6B depicts another exemplary embodiment of at least a portion of the elements of a processing module;

FIG. 7 depicts an exemplary embodiment of another assembled portion the device of FIG. 1;

FIG. 8 depicts an exemplary embodiment of an unassembled portion of the device of FIG. 1;

FIG. 9 depicts an exemplary embodiment of the device of FIG. 1 when assembled;

DETAILED DESCRIPTION OF THE INVENTION

The inventors of commonly assigned U.S. Pat. No. 5,606,621 entitled "HYBRID BEHIND-THE-EAR AND COMPLETELY-IN-CANAL HEARING AID," the contents of which are hereby incorporated herein by reference, developed a hybrid behind-the-ear ("BTE")/completely-in-canal (CIC) hearing aid. In one embodiment, the hearing aid of the '621 application has two components: a BTE component and a CIC component. Preferably, these components are mechanically isolated from each other. The BTE component, which is worn behind the ear, preferably includes at least a microphone. In one embodiment, the BTE also includes a power source, and sound processing circuitry (e.g., amplifiers, compressors, filters, etc.). Meanwhile, the CIC component is preferably shaped to fit into the ear canal of the patient in such a manner as to touch the bony portion of the ear canal. In one embodiment, the CIC component contains a speaker, the speaker preferably being operatively connected to the sound processing circuitry of the BTE component. In a preferred embodiment of the '621 application, because the BTE and CIC components are mechanically isolated from each other, electroacoustic feedback is greatly reduced. Additionally, because in a preferred embodiment, the CIC component is located so deep in the patient's ear canal as to touch the bony portion, the hearing aid does not cause the patient to experience the occlusion effect.

Figure 1:
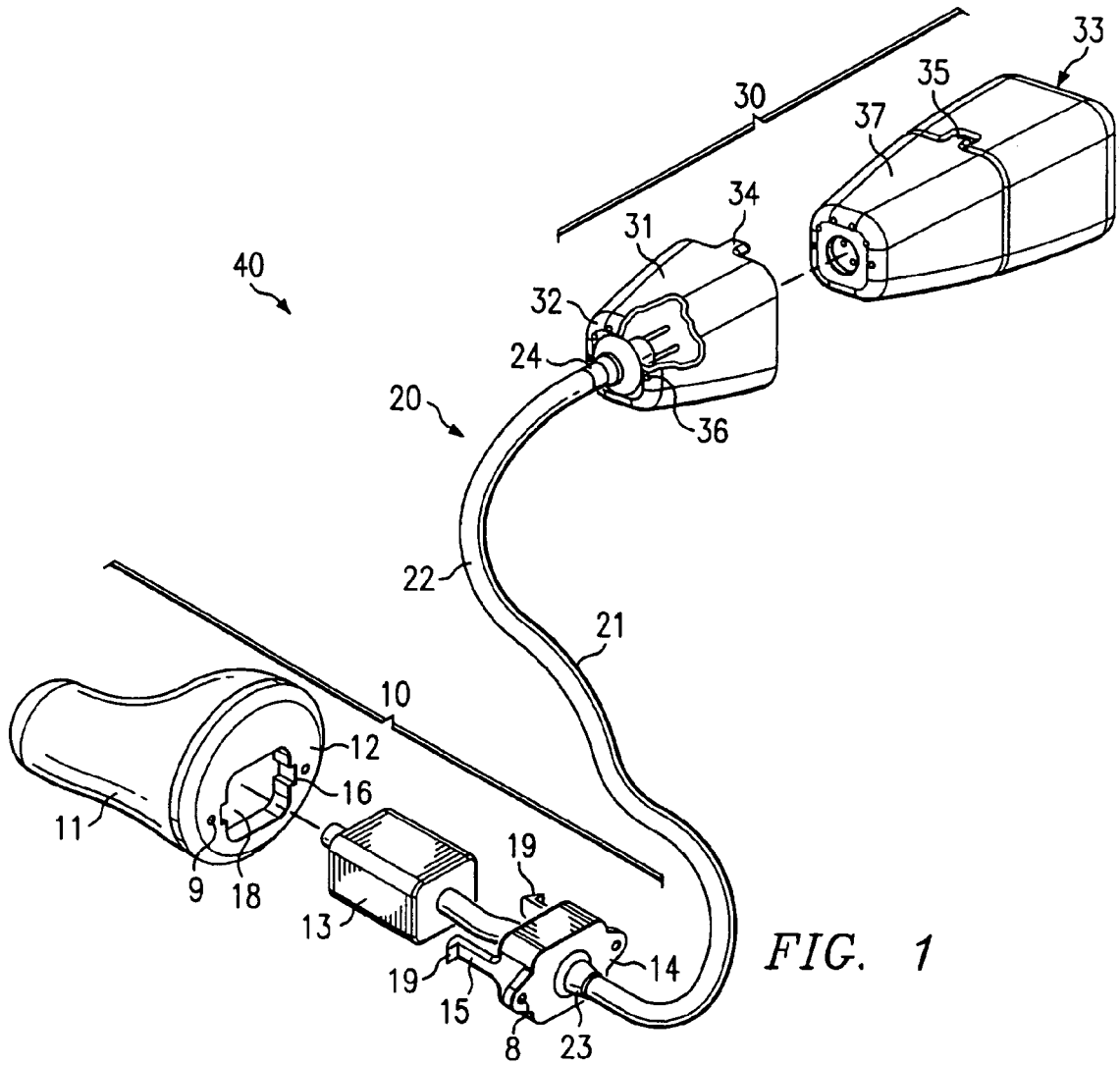
FIG. 1 depicts an exploded isometric view of an exemplary embodiment of an earpiece auditory device in accordance with the present invention.

A preferred embodiment of the present invention expands upon the design of the hearing aid(s) disclosed in the '621 application. FIG. 1 depicts an exploded isometric view of an exemplary embodiment of a BTE/CIC earpiece auditory device of the present invention. In the embodiment of FIG. 1, earpiece auditory device 40 includes completely-in-canal unit 10, connector 20, and behind-the-ear unit 30. Preferably, when in use, behind-the-ear unit 30 is placed behind an ear of a user, while completely-in-canal unit 10 is inserted so deep into the user's ear canal as to touch the bony portion of the ear canal.

According to the illustrated embodiment, completely-in-canal unit 10 includes ear mold 11. Preferably, ear mold 11 is at least partially hollow on the inside. In one embodiment, completely-in-canal unit 10 also includes speaker receiving member 12, preferably at a first end of mold 11. Speaker receiving member 12 may be part of ear mold 11 itself or may be attached thereto (e.g., through an adhesive, screws, a detachable coupling, or some other fastening means). In some embodiments, receiving member 12 comprises a plate that includes opening 18. Furthermore, in one embodiment, member 12 also includes one or more speaker fastening grooves (e.g, groove 16). In addition to or in lieu of the above, in some embodiments, speaker receiving member 12 includes one or more mounting holes for receiving screws and/or other fastening means (e.g., mounting hole 9).

Ear mold 11 and/or speaker receiving member 12 may be made from hard material (e.g., acrylics), soft material (e.g., silicones or foam material), or some combination thereof. In one embodiment where mold 11 is made from hard material, at least a portion of the mold is covered with a foam boot or slip. The foam boot or slip may be fastened to mold 11 by numerous fastening means to include an adhesive, friction, screws, etc. Receiving member 12 may be made from the same or different material than that of ear mold 11.

The illustrated size and shape of ear mold 11 shown in FIG. 1 is by way of example only, for ear mold 11 may be of various different sizes and shapes, to include the dimensions of a particular user's ear (e.g., the ear mold may be customized/tailored to a particular user). Ear mold 11 may also be such that it provides a universal fit that is satisfactory for a number of users. For example, at least a portion of mold 11 may be made from foam (or similar material) or covered with a foam slip (or like component), either of which is able to change shape (e.g., expand, compress, deform) to meet the dimensions of the user's inner and/or outer ear. In addition, ear mold 11 may be transparent, translucent, or opaque, or some combination thereof.

In a preferred embodiment, ear mold 11 is of a particular size and shape such that completely-in-canal unit 10 may be placed so deep into a user's ear canal as to touch the bony portion of the user's hearing canal. In one embodiment, the ability to produce a completely-in-canal unit of a sufficient size to place the unit so deep into the user's ear canal as to touch the bony portion is facilitated, at least in part, by limiting the number of elements included in completely-in-canal unit 10.

Moreover, in a preferred embodiment, in addition to ear mold 11, completely-in-canal unit 10 includes speaker 13. Any speaker suitable for use in an earpiece auditory device may be used as speaker 13 (e.g., earpiece device speakers available from Knowles Electronics, Inc.). It will be appreciated that the speaker of an earpiece auditory device is also known in the art as a "receiver". The term "speaker" is used here to avoid confusion with other possible components of device 40 described in detail below.

In some embodiments, in addition to the above, completely-in-canal unit 10 includes speaker fastener 14. Speaker fastener 14 may be made from any one of numerous suitable materials to include plastics and/or metals. In one embodiment, speaker fastener 14 includes one or more projections (e.g., projection 15). Moreover, in some embodiments, one or more of the projections of speaker fastener 14 include appendage 19. Furthermore, in one embodiment, in addition to or in lieu of the above, speaker fastener 14 includes one or more mounting holes (e.g., mounting hole 8) for securing speaker fastener 14 to ear mold 11 and/or receiving member 12 using screws or other fastening means.

Figure 4:
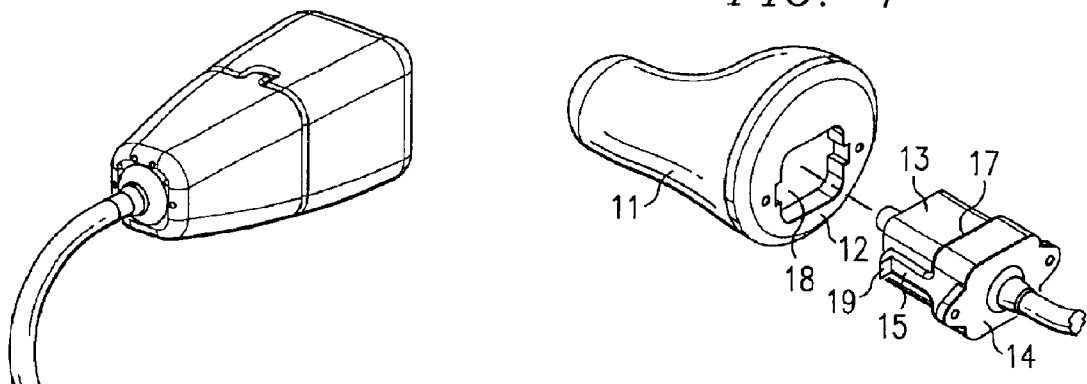
FIG. 4 depicts an unassembled portion of an exemplary embodiment of an earpiece auditory device in accordance with the present invention wherein a speaker is at least partially disposed within a speaker fastener.
Figure 5:
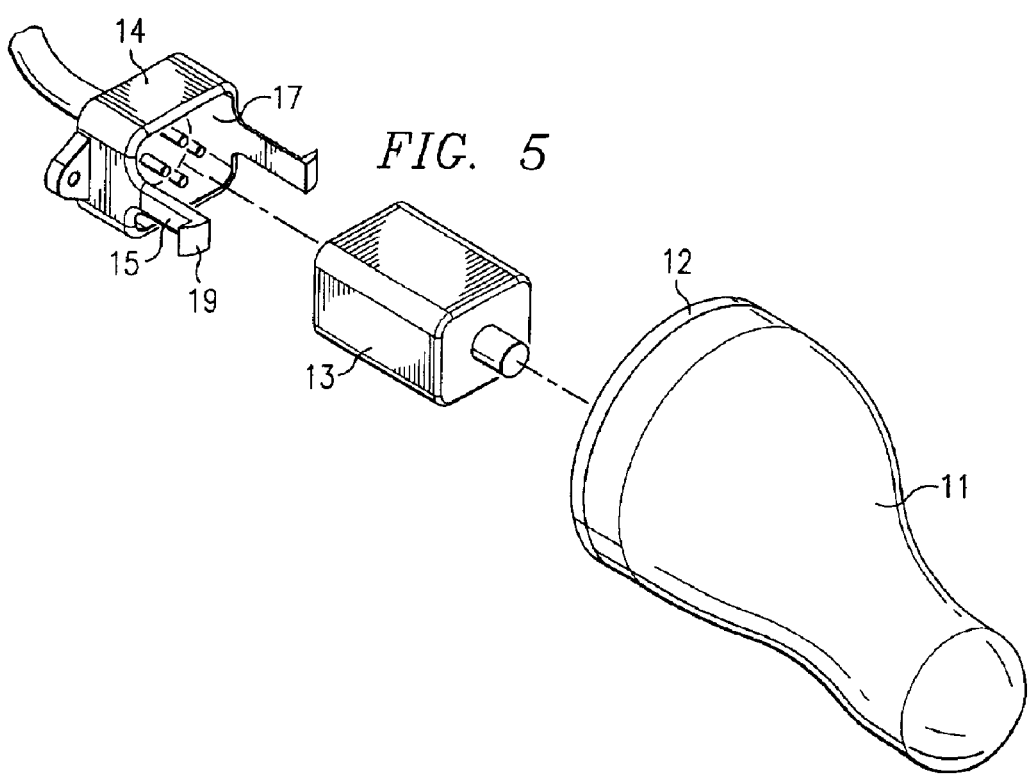
FIG. 5 depicts an unassembled portion of an exemplary embodiment of an earpiece auditory device in accordance with the present invention prior to a speaker being at least partially disposed within a speaker fastener.

In a preferred embodiment, the configuration of fastener 14 is such that at least a portion of speaker 13 fits within an area, at least partially, defined by fastener 14. For example, in one embodiment, as part of assembling device 40, speaker 13 is, at least partially, disposed within space 17 (as shown in FIG. 4). As can be in FIG. 5, space 17 is, at least partially, defined by a surface of speaker fastener 14. In the embodiments of FIGS. 4 and 5, the projection(s) of fastener 14 may help guide speaker 13 into space 17.

In some embodiments, speaker 13 is communicatively (e.g., electrically) and/or physically coupled to speaker fastener 14. Speaker 13 and fastener 14 may be fixedly coupled, such as the hard-wire coupling depicted in FIG. 1. On the other hand, speaker 13 and fastener 14 may be detachably coupled, e.g., through the detachable electrical hole and prong arrangement shown in FIG. 5. In some embodiments (e.g., the embodiments of FIGS. 4 and 5), at least a portion of speaker fastener 14 acts as a guard to protect the communicative coupling between speaker 13 and speaker fastener 14 from one or more undesirable elements (e.g., cerumen, moisture, and the like) that may be present in the environment in which speaker 13 and fastener 14 are used. Accordingly, preferably in such embodiments, speaker fastener 14 facilitates an insulated communicative coupling between speaker 13 and fastener 14.

As mentioned, preferably, ear mold 11 is at least partially hollow on the inside. Accordingly, in one embodiment, ear mold 11 may receive internally one or more other elements of device 40. In some embodiments, at least a portion of speaker fastener 14, along with speaker 13, which may be partially disposed therein, are passed through opening 18 in receiving member 12 and into ear mold 11 (e.g., the assembled portion of device 40 shown in FIG. 2). Similar to earlier discussions, in a preferred embodiment, speaker 13 and/or speaker fastener 14 are of a particular size and shape such that when speaker 13 and/or speaker fastener 14 are coupled to ear mold 11, the assembly of ear mold 11, speaker 13, and/or speaker fastener 14 may be placed so deep into a user's ear canal as to touch the bony portion of the user's ear canal.

Moreover, in one embodiment, speaker fastener 14 and/or speaker 13, are securely (and, in one embodiment, detachably) coupled to ear mold 11 and/or receiving member 12. In some embodiments, such a secure (preferably detachable) connection is facilitated by the projection(s) of fastener 14 engaging the fastening groove(s) of receiving member 12. In one of these embodiments, appendage 19 of the projection(s) engages the fastening groove(s). In addition to or in lieu of the above, speaker fastener 14 and/or speaker 13 may be secured to ear mold 11 and/or speaker receiving member 12 by passing at least a portion of a screw(s) or other fastening means through the mounting holes of receiving member 12 and speaker fastener 14 (e.g., the assembled portion of FIG. 2). In a preferred embodiment, the coupling between fastener 14, ear mold 11, and/or receiving member 12 is of sufficient strength such that unit 10 may be removed from the user's ear canal by pulling on connector 20.

Accordingly, speaker 13, fastener 14, receiving member 12, and/or ear mold 11 can be securely fastened together. However, in some embodiments, some or all of these elements can also be conveniently attached to and detached from each other, thus allowing for convenient and easy assembly and/or disassembly of earpiece device 40, as well as allowing for the replacement of any inoperative, defective, or otherwise unsatisfactory parts with relative ease.

For instance, if speaker 13 fails for some reason (e.g., speaker 13 is defective or the speaker simply becomes inoperative (a common earpiece auditory device malady)), in one embodiment, connector plate 14, with speaker 13 disposed therein, may be detached from ear mold 11, e.g., by depressing portions of ear mold 11, member 12, and/or fastener 14, thereby releasing the appendages of fastener 14, and pulling fastener 14 from ear mold 11. In addition to or in lieu of the above, in one embodiment, speaker connector plate 14 is detached from ear mold 11 and/or receiving member 12 by removing screws coupling fastener 14 to receiving member 12.

Furthermore, in one embodiment, after its removal from the inside of mold 11, speaker 13 may be separated from fastener 14 through the application of a pulling force (e.g., where speaker 13 and fastener 14 are coupled via a hole and prong arrangement). Thereafter, in one embodiment, the replacement speaker may be coupled to fastener 14 by pressing the electrical prongs of fastener 14 into the receiving holes of the replacement speaker (or vice versa). Then, in some embodiments, speaker fastener 14, and the attached replacement speaker, may be passed through receiving member 12 until the appendages of fastener 14 engage the grooves of receiving member 12.

In one embodiment, completely-in-canal unit 10 has an open mold configuration, meaning the ear canal of a user is at least partially open when completely-in-canal unit 10 is inserted so deep into the user's ear canal as to touch the bony portion. Moreover, in some embodiments, completely-in-canal unit 10 (e.g., ear mold 11) includes a vent(s) by which sound waves may pass over and/or through unit 10. In an embodiment of completely-in-canal unit 10 wherein unit 10 includes a vent(s), unit 10 also includes a filter to keep cerumen, dirt, moisture, and other undesirable elements from entering unit 10.

Figure 2:
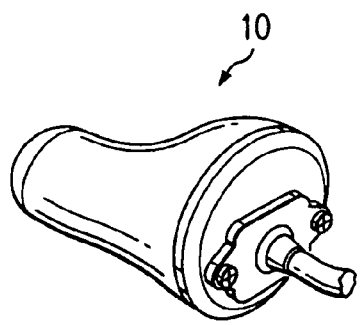
FIG. 2 depicts an exemplary embodiment of an assembled portion of the device of FIG. 1.
Figure 3:
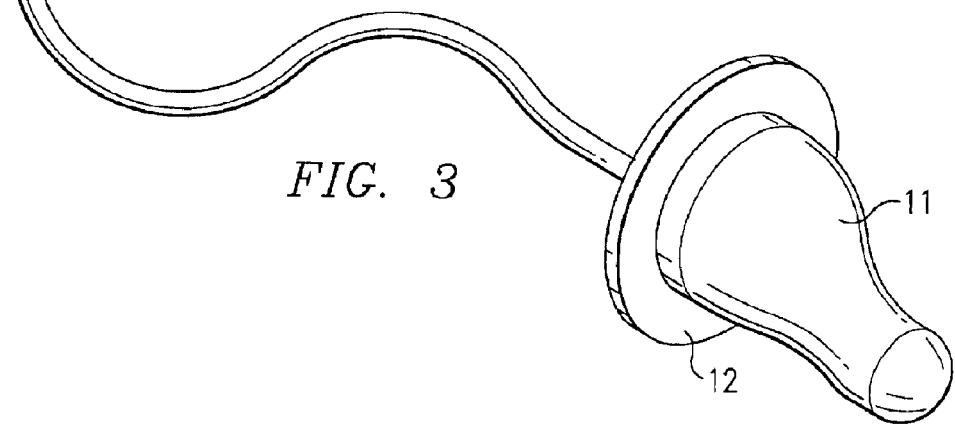
FIG. 3 depicts another exemplary embodiment of an earpiece auditory device in accordance with the present invention.

Furthermore, in one embodiment, the dimensions of a surface of receiving member 12 are such that member 12 may be flush with a surface of ear mold 11 (as an example, the assembled portion of device 40 shown in FIG. 2). Moreover, in one embodiment, at least one dimension of receiving member 12 is initially larger, in some instances substantially larger, than a dimension of ear mold 11 (an example of such a receiving member is depicted in FIG. 3). Then, as part of the assembly of device 40 in such embodiments, speaker receiving plate 12 is ground down or otherwise reduced in size, so as to be flush with a surface of ear mold 11.

The size and shape of the elements of unit 10, as well as the arrangement of the elements, depicted in FIG. 1 are by way of example only, for the elements may be of a different size and shape, as well as arranged in a manner different from that which is depicted in FIG. 1. Moreover, elements not depicted in FIG. 1 may be included in unit 10. For example, in one embodiment speaker fastener 14 or receiving member 12 includes a retrieval line for aiding a user in retrieving and/or inserting unit 10 into and out of the user's ear canal. Furthermore, elements included in FIG. 1 may be absent from unit 10. For example, in one embodiment, at least one of the elements of completely-in-canal unit 10 depicted in FIG. 1 is included as part of connector 20, behind-the-ear unit 30, and/or some portion of device 40 other than completely-in-canal unit 10. For instance, in some embodiments, speaker fastener 14 is part of connector 20, rather than unit 10. In addition to or in lieu of the above, in one embodiment, speaker 13 is part of connector 20, rather than unit 10.

In a preferred embodiment, in addition to completely-in-canal unit 10, earpiece auditory device 40 includes behind-the-ear unit 30. In a preferred embodiment, unit 30 includes processing module 33. In one embodiment, module 33 includes housing 37 (housing 37 preferably being made from plastic). Furthermore, in some embodiments, module 33 includes at least one or some combination of a microphone(s), a communications link(s), processing circuitry (which may include sound processing circuitry), and/or a power source. Preferably, the above described elements of module 33 are integrated with housing 37.

Any microphone suitable for use in an earpiece auditory device may be employed as the microphone(s) in embodiments of module 33 (e.g., microphones available from Knowles Electronics, Inc.). Moreover, the microphone(s) may be either omni, directional, or some combination thereof.

In addition, the earlier mentioned processing circuitry (which, in one embodiment, includes sound processing circuitry) may include any and all hardware, software, firmware, and/or the like, necessary for the intended operation of the earpiece auditory device. As non-limiting examples, the processing circuitry may include an amplifier(s) (in one embodiment, multi-channel and programmable), compressor(s), filter(s), packetizing circuitry, depacketizing circuitry, modulation circuitry, conversion circuitry, and/or the like. Such circuitry may include analog, programmable analog, digital circuitry, and/or a combination thereof. In one embodiment, the processing circuitry processes electrical (and/or other) signals that are to be provided to speaker 13, where the signals are converted to acoustic waves. In addition to or in lieu of the above, in one embodiment, the processing circuitry processes electrical (and/or other signals) for transmission (be it wireline or wireless) to a remote device(s).

Moreover, in a preferred embodiment, the earlier mentioned communications link enables device 40 to communicate with a remote device (e.g., via wireline and/or wireless transmissions). In one embodiment, the communications link includes a wireless input receiver for receiving wireless transmissions (e.g., a radio frequency (RF) receiver or a magnetic induction coil), a transmitter for broadcasting wireless transmissions, and/or combinations thereof (e.g., a transceiver). These wireless transmissions may be radio RF transmissions, optical transmissions (e.g., infrared), magnetic induction transmissions, acoustic waves (e.g.,ultrasonic), capacitive coupling transmissions, as well as other forms of wireless communications. In some embodiments, the wireless receiver, transmitter, etc., of the communications link includes accompanying circuitry.

With respect to the above discussed power source, in one embodiment, the power source of module 33 is a battery. In some embodiments, the power source of module 33 is rechargeable. Furthermore, in one embodiment, the power source is external to module 33 (e.g., an adapter).

Preferably, the particular element or combination of elements that is included as part of a particular embodiment of module 33, as well as the make up of each element, depends upon the intended use of the particular embodiment of earpiece auditory device 40. For example, when earpiece auditory device 40 is to be used to convert acoustic waves from the user's environment into representations of the acoustic waves via electrical (and/or other) signals, whereby the signals are then processed and provided to speaker 13 (e.g. when device 40 is to be used as a hearing aid), module 33 preferably includes at least a microphone(s), processing circuitry, and a power source.

An example of such an embodiment of module 33 is provided in FIG. 6A. As illustrated, at least a portion of the interior of module 33 includes a connector 60 for communicatively (preferably detachably) and/or physically coupling module 33 to module fastener 31 (shown in FIG. 1) and/or connector 20. In one embodiment, such a communicative coupling is an electrical coupling. Preferably, connector 60 is communicatively (e.g., electrically) coupled to processing circuitry 61, which may include sound processing circuitry. In one embodiment, processing circuitry 61 is also communicatively coupled to microphone 62. Preferably, shuttle 33 also includes power source 63 (e.g., a battery).

In some of the above discussed embodiments, the sound processing circuitry of processing circuitry 61 includes high gain circuitry. However, in some embodiments, the sound processing circuitry may be low or no gain circuitry. Moreover, in some of the above embodiments, device 40 may amplify some sounds, while allowing other sounds to be provided to speaker 13 without amplification. Furthermore, in one embodiment, device 40 may allow some sounds to be provided directly to the user's ear drum without first being converted into electrical (and/or other) signals (e.g., the earpiece device is an open mold configuration and/or includes a vent(s)).

Furthermore, in one embodiment, the sound processing circuitry of module 33 includes sound amplitude reduction circuitry. For example, in some embodiments, earpiece auditory device 40 may be used as an electronic earplug or other sound reduction device. In one of these embodiments, module 33 includes sound amplitude reduction circuitry whereby sounds received at the microphone are reduced (sometimes greatly reduced) in volume before being provided to speaker 13, if such sounds are not eliminated altogether by the circuitry. Moreover, in one of these sound reduction embodiments, device 40 may reduce the volume or eliminate certain sounds, while allowing other sounds to be provided to speaker 13 or directly to the user's ear drum (e.g., the earpiece device is an open mold configuration and/or includes a vent(s)).

In embodiments where earpiece auditory device 40 is to be used in a manner wherein electrical and/or other signals are to be directly inputted (either by wired or wireless transmissions) to device 40 and/or transmitted by device 40 (in wired or wireless form), e.g., when used as an earphone, monitor, or IFB device, module 33 preferably includes at least the earlier mentioned communications link, processing circuitry, and a power source. In one of these embodiments, the sound processing circuitry included in the processing circuitry of module 33 is high gain, low gain, no gain, and/or sound reduction circuitry.

An example of such an embodiment of module 33 is provided in FIG. 6B. As illustrated, at least a portion of the internal elements of module 33 includes connector 60 for communicatively (preferably detachably) and/ or physically coupling module 33 to module fastener 31 and/or connector 20. Similar to FIG. 6A, in one embodiment, connector 60 is communicatively (e.g., electrically) coupled to processing circuitry 61, which may include sound processing circuitry. However, rather than being coupled to a microphone as in FIG. 6A, circuitry 61 is communicatively coupled to communications link 64. In the illustrated embodiment, shuttle 33 also includes power source 63 (e.g., a battery).

Furthermore, in embodiments where device 40 is to be used to receive and/or transmit data or other transmissions via a wired or wireless means to and/or from a remote device, e.g., a computer device (such as audio files, MP3 files, voice streams, video streams, Internet broadcasts, etc.) and/or a cell phone, preferably the communications link and/or processing circuitry of shuttle 33 is compliant with the various transmission formats, protocols (e.g., TCP/IP, Bluetooth), and/or interfaces necessary to receive and process the transmissions.

Moreover, in some embodiments, device 40 may be used to directly receive and/or transmit electrical (and/or other) signals, as well as convert acoustic waves into electrical (and/or other) signals. For example, in one embodiment, device 40 may convert the user's voice and/or other acoustic waves from the environment into electrical (and/or other) signals. Moreover, such signals may be processed and transmitted to speaker 13. In addition, such signals may be processed and transmitted to a remote device(s) (e.g., a cell phone, an intercom system). Furthermore, device 40 may receive signals from the remote device(s). In one of these embodiments, at least a portion of the interior of module 33 resembles the embodiment of FIG. 6A with the addition of communications link 64 communicatively coupled to processing circuitry 61.

Furthermore, in one embodiment, in addition to module 33, behind-the-ear unit 30 includes module fastener 31. In some embodiments, module fastener 31 facilitates the coupling of module 33 to connector 20. In one embodiment, at least a portion of module fastener 31 is made from plastic. Moreover, module fastener 31 may be transparent, translucent, opaque, and/or a combination thereof. In FIGS. 1 and 8, for purposes of illustration only, a portion of fastener 31 has been removed to enable the electrical prongs of one embodiment of device 40 to be seen.

In one embodiment, when earpiece auditory device 40 is assembled, fastener 31 is securely (preferably detachably) coupled to module 33 (as shown in FIG. 7). For example, in one embodiment, fastener 31 is of such a shape that it slips over at least a portion of module 33. Moreover, in one embodiment, fastener 31 includes one or more fastening projections (e.g, fastening projection 34) that engage one or more fastening notches of module 33 (e.g., notch 35) when fastener 31 is slipped over module 33 (thereby securing the attachment). In one of these embodiments, the one or more fastening projections include an appendage(s) for engaging the fastening notches. In addition to or in lieu of the above, fastener 31 may be coupled to module 33 by other means (e.g., screws, adhesives, and/or other fastening means). In a preferred embodiment, the coupling between fastener 31 and module 33 is of sufficient strength that completely-in-canal unit 10 may be removed from within the user's ear canal by pulling on connector 20, without separating fastener 31 from module 33. Furthermore, in one embodiment, the coupling between fastener 31 and module 33 is of sufficient strength that behind-the-ear unit 30 may be removed from behind the user's ear by pulling on connector 20.

In some embodiments, module 33 and fastener 31 can be detached from and/or reattached to each other. In one embodiment, this may be accomplished by depressing a surface(s) of fastener 31 and pulling the two pieces apart (e.g., an embodiment where the projection(s) of fastener 31 engage the notch (es) of shuttle 33). In one embodiment, module 33 may be detached from fastener 31 by removing screws coupling the two components together.

Furthermore, in some embodiments, module 33 is communicatively (e.g., electrically) coupled to fastener 31. In one embodiment, the communicative coupling between module 33 and fastener 31 is fixed, e.g., hard-wired. In an alternative embodiment, the communicative coupling between shuttle 33 and fastener 31 is detachable, e.g., the detachable prong and hole connection shown in FIGS. 1 and 8. In one embodiment where fastener 31 is communicatively coupled to module 33, at least a portion of fastener 31 acts as a guard to protect the communicative coupling between fastener 31 and module 33 from one or more undesirable elements (e.g., moisture, dirt particles, etc.) that may be present in the environment in which unit 30 is used (e.g., the embodiments of FIGS. 1 and 8). Thereby, in such embodiments, fastener 31 preferably facilitates an insulated communicative coupling between the fastener and module. Moreover, in one embodiment, the projections of fastener 31 may help align electrical prongs of fastener 31 with receptacle holes of module 33 (or vice versa).

In addition, in some embodiments, fastener 31 includes a plurality of holes 36 that facilitate the passage of sound through fastener 31 and/or into module 33. In some of these embodiments, a filter 32 is included within fastener 31 to prevent foreign and unwanted particles (e.g., dirt and moisture) from getting inside fastener 31 and/or passing into module 33. In one embodiment, when the filter is no longer capable of providing satisfactory protection, the filter may be replaced by separating fastener 31 and module 33 (e.g., in the manner described above), removing the old filter from fastener 31, and placing a new filter therein. In some embodiments, rather than being included as part of fastener 31, filter 32 is part of module 33.

Preferably, module fastener 31 and/or module 33 are shaped so as to funnel sounds into the interior of module 33. For example, in one of the embodiments where module 33 includes a microphone, module fastener 31 and/or module 33 may be shaped so as to funnel sounds towards the microphone.

Moreover, as mentioned, in a preferred embodiment, when in use, behind-the-ear unit 30 is placed behind the cartilage of the user's ear. In one embodiment, fastener 31 and/or module 33 are of such size and shape that they are invisible to the casual observer when placed behind the cartilage of the user's ear. In addition, in some embodiments, fastener 31 and/or module 33 includes (or forms) an earhook that enables unit 30 to sit on top of the user's ear.

As discussed, in one embodiment, module 33 and fastener 31 can be securely fastened together. However, preferably, these individual elements can be easily detached from and reattached to each other, thus allowing for convenient assembly and disassembly, as well as replacement of any inoperative, defective, or otherwise unsatisfactory parts. For instance, if module 33 fails for some reason (e.g., moisture shorts the processing circuitry), in some embodiments, module 33 and fastener 31 can be detached from each other (in one embodiment, by depressing a surface(s) of fastener 31 and pulling the two pieces apart). A replacement module can then be selected. Afterwards, in one embodiment, fastener 31 can be coupled to the replacement module by slipping the fastener over the replacement module until the projections of fastener 31 engage the notches of the replacement module The dimensions and arrangement of the elements of behind-the-ear unit 30 shown in FIG. 1 is by way of example only, as the elements may be of a different size and shape, as well as arranged in a manner different from that which is depicted in FIG. 1. In addition, elements not depicted in FIG. 1 may be included in unit 30. On the other hand, elements included in FIG. 1 may be absent from unit 30. Furthermore, rather than being part of unit 30, some of the elements of unit 30 depicted in FIG. 1 may instead be part of connector 20, speaker module 10, or some portion of earpiece auditory device 40 other than MRP module 30. For example, in one embodiment, fastener 31 is part of connector 20.

In addition to the above, in one embodiment, connector 20 physically (preferably detachably) couples completely-in-canal-unit 10 to behind-the-ear unit 30. In a preferred embodiment, connector 20 includes at least one end that may be detachably physically coupled to unit 10 or unit 30. Also, in one embodiment, as part of the physical coupling of behind-the-ear unit 30 to completely-in-canal unit 10, connector 20 communicatively (e.g., electrically) couples completely-in-canal unit 10 to behind-the-ear unit 30. Moreover, in one embodiment, at least one of the earlier mentioned one or more ends of connector 20 that may be detachably physically coupled to unit 10 or unit 30 may be detachably communicatively coupled to unit 10 or unit 30.

In some embodiments, connector 20 includes hollow tubing 21 (preferably insulated and made from plastic). In one of these embodiments, wire cable(s) 22 is disposed within tubing 21. Preferably, only two or three wire cables are disposed within tubing 21. However, a greater or fewer number of wires can be disposed therein. For example, the processing circuitry of module 33 may require a greater or lesser number of wire cables within tubing 21. In an alternative embodiment, unit 10 and unit 30 are communicatively coupled via a wireless connection, and thus, wire cable(s) 22 are not present. Furthermore, as discussed earlier, in some embodiments, speaker 13, speaker fastener 14 and/or module fastener 31 are part of connector 20.

Preferably, wire cable(s) 22 is communicatively (e.g., electrically) and/or physically coupled to speaker fastener 14 (e.g., coupling 23 of FIG. 1). The communicative and/or physical coupling between wire cable(s) 22 and speaker fastener 14 may be fixed, such as through hard-wiring. On the other hand, the coupling between wire cable(s) 22 and speaker fastener 14 may be detachable, e.g., through a detachable electrical prong and hole arrangement.

Similarly, in one embodiment, wire cable(s) 22 is communicatively (e.g., electrically) and/or physically coupled to module fastener 31 (e.g., coupling 24 of FIG. 1). As was the case with respect to speaker fastener 14, the communicative coupling between wire cable(s) 22 and module fastener 31 may be fixed, such as through hard-wiring. On the other hand, the communicative coupling between wire cable(s) 22 and module fastener 31 may be detachable, e.g., through a detachable prong and hole arrangement.

In a preferred embodiment, connector 20 is of sufficient length to physically and/or communicatively couple unit 30 to unit 10 when unit 30 is placed behind-the-ear of a user and unit 10 is placed within the ear canal of a user so far as to touch the bony portion of the ear canal. Moreover, when in use, preferably a first portion of connector 20 is at least within the ear canal of the user. In some embodiments, e.g., when speaker 13 and/or speaker fastener 14 are part of connector 20, similar to the manner discussed earlier with respect to unit 10, a portion of connector 20 is inserted within and coupled to ear mold 11 of unit 10, e.g., through receiving member 12 (e.g., the assembled portion of device 40 depicted in FIG. 2). Accordingly, in one embodiment, a portion of connector 20, when in use, is part of an assembly that includes ear mold 11 and receiving member 12 of unit 10 that may be inserted so deep within the user's ear canal as to touch the bony portion. Furthermore, when in use, preferably a second portion of connector 20 is located behind the ear of the user (to include embodiments where fastener 31 is not part of connector 20). In addition, preferably, the dimensions of connector 20 are such that those portions of connector 20 not in the bony portion or outer portion of the user's ear canal or behind the user's ear are taut against the head of the user when device 40 is in use. In a preferred embodiment, the dimensions of connector 20 are such that connector 20 is indiscernible to one casually viewing the user when device 40 is in use.

Accordingly, completely-in-canal unit 10, connector 20, and behind-the-ear unit 30 may be physically and/or communicatively coupled together. In a preferred embodiment, one or more of these couplings are detachable, such that, unit 10 and/or unit 30 can be easily attached to and detached from connector 20 or vice versa, thus allowing for convenient and easy assembly of auditory device 40, as well as relatively easy replacement of any inoperative, defective, or otherwise unsatisfactory parts.

For instance, if connector 20 is deficient for some reason (e.g., a wire has failed and/or connector 20 is too long and thus is cosmetically undesirable when the device is in use), in one embodiment, the end of connector 20 coupled to unit 10 may be easily detached (at least relatively speaking) from unit 10 by pulling the pieces apart (e.g., embodiments where connector 20 is detachably coupled to fastener 14, such as through a hole and prong arrangement). Furthermore, in one embodiment, connector 20 may be detached from unit 30 by pulling apart a detachable coupling between connector 20 and fastener 31 (e.g., when connector 21 and fastener 31 are coupled via a hole and prong arrangement). In addition, an acceptable replacement connector may be selected. Afterwards, in one embodiment, one end of the replacement connector may be coupled to unit 10 by pushing fastener 14 and connector 20 together (e.g., a hole and prong coupling), while a second end of the replacement connector may be coupled to unit 30 by pushing connector 20 and fastener 31 together (e.g., a hole and prong coupling as well).

In some of the embodiments where speaker fastener 14 and/or module fastener 31 are part of connector 20, connector 20 may be separated from ear mold 11 by depressing a portion(s) of ear mold 11, receiving member 12, and/or fastener 14 and pulling fastener 14 from ear mold 11. In embodiments where speaker 13 is part of unit 10, fastener 14 may then be removed from unit 10 by pulling speaker 13 from fastener 14 (e.g., where fastener 14 and speaker 13 are coupled via a hole and prong arrangement). In addition, in one embodiment, connector 20 may be separated from unit 30 by depressing a portion(s) of fastener 31 and pulling fastener 31 from module 33. A new connector may than be coupled (or the previous connector re-coupled) to unit 10 and/or unit 30 via one of the earlier described means for coupling fastener 14 to speaker 13 and ear mold 11 and/or coupling fastener 31 to shuttle 33.

Similar to earlier discussions, in a preferred embodiment, the coupling between connector 20 and unit 10 is of sufficient strength such that unit 10 may be removed from within the user's ear canal by pulling on connector 20. Moreover, in addition to or in lieu of the above, in one embodiment, the coupling between connector 20 and unit 30 is of sufficient strength such that unit 30 may be removed from behind the user's ear by pulling on connector 20.

The size, shape, dimensions, etc., of connector 20 shown in FIG. 1 are by way of example only, as connector 20 can be of numerous sizes and shapes. In addition, elements not depicted in FIG. 1 may be included in connector 20. For example, in one embodiment where speaker fastener 14 is part of connector 20, fastener 14 includes a retrieval line for aiding a user in retrieving and/or inserting unit 10 into and out of the user's ear canal. On the other hand, elements included in FIG. 1 may be absent from connector 20. Moreover, as mentioned, in at least one embodiment, connector 20 includes speaker 13, fastener 14, and/or fastener 31.

FIG. 9 depicts the embodiment of earpiece auditory device 40 shown in FIG. 1 after the embodiment of device 40 has been assembled. Again, it will be appreciated that the elements of device 40, as well as the arrangement of these elements, depicted in 9 are by way of example only, for earpiece auditory device 40 may have several configurations.

Figure 10A:
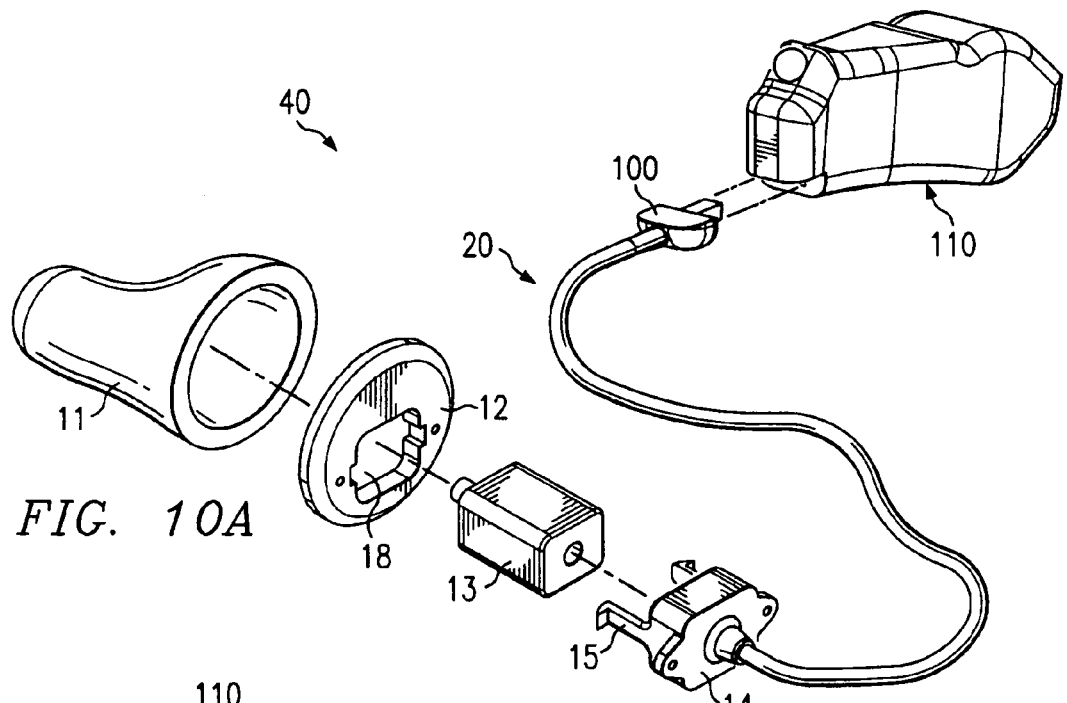
FIG. 10A depicts an exploded isometric view of a second exemplary embodiment of an earpiece auditory device in accordance with the present invention.
Figure 10B:
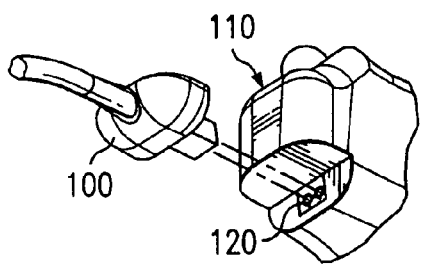
FIG. 10B depicts an exemplary embodiment of a connector and a processing module of FIG. 10A prior to coupling.
Figure 10C:
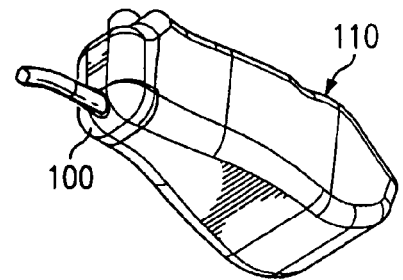
FIG. 10C depicts an exemplary embodiment of a connector and a processing module of FIG. 10B after coupling.

As a non-limiting example of such, FIGS. 10A, 10B, and 10C depict an alternative embodiment of earpiece auditory device 40. In the embodiment of FIG. 10A, similar to the embodiment illustrated in FIG. 1, earpiece auditory device 40 includes earmold 11, speaker receiving member 12, speaker 13 and speaker fastener 14. The earlier discussions regarding ear mold 11, speaker receiving member 12, speaker 13 and speaker fastener 14 apply equally as well to the embodiments of these elements present in the embodiment of FIG. 10A.

Also similar to the embodiment of FIG. 1, device 40 also includes connector 20. The above discussions regarding connector 20 also apply equally as well to connector 20 of FIG. 10A. However, in the embodiment of FIG. 10A, rather than potentially including module fastener 31, connector 20 instead includes module fastener 100. Preferably, module fastener 100 is operable to plug into connector receptacle 120 of processing module 110 (as shown in FIGS. 10B and 10C).

Processing module 110 of FIGS. 10A, 10B, and 10C is similar to module 30, one difference being that module 110 does not potentially include fastener 31. Otherwise, the above discussions regarding module 30 apply equally as well to module 110.

Figure 11A:
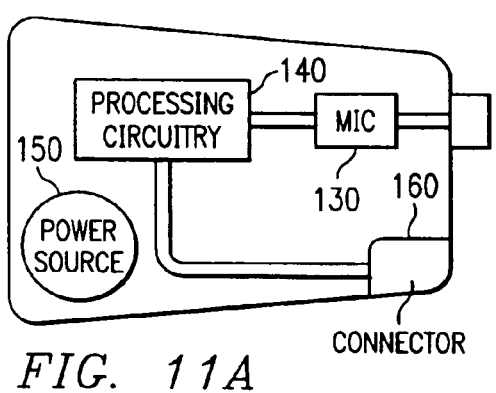
FIG. 11A depicts an exemplary embodiment of at least a portion of the elements of a processing module of the device of FIG. 10A.
Figure 11B:
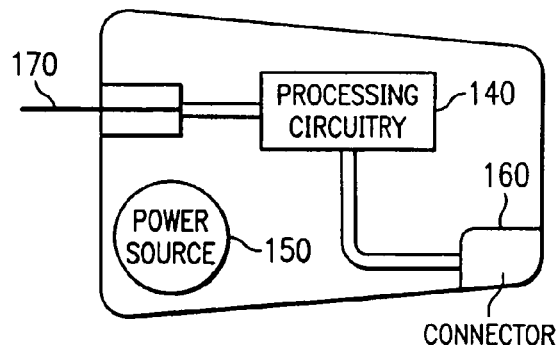
FIG. 11B depicts a second exemplary embodiment of at least a portion of the elements of a processing module of the device of FIG. 10A.

Exemplary embodiments of at least a portion of the interior of module 110 are depicted in FIGS. 11A and 11B. In the embodiment of FIG. 11A, at least a portion of the interior of module 110 includes a connector 160 (which preferably includes receptacle 120) for communicatively (e.g., electrically) and/or physically coupling module 110 to connector 20. In one embodiment, such a coupling(s) is detachable. Moreover, in one embodiment, connector 160 is communicatively coupled to processing circuitry 140 (similar to earlier discussions, such processing circuitry may include sound processing circuitry). In the illustrate embodiment, processing circuitry 140 is communicatively coupled to microphone 130. In one embodiment, module 110 includes power source 150 (e.g., a battery).

Another exemplary embodiment of at least of a portion of the interior of module 110 is depicted in FIG. 11B. Similar to FIG. 11A, in the embodiment of FIG. 11B, the internal circuitry of module 110 includes connector 160 for communicatively (e.g., electrically) and/or physically coupling module 110 to connector 20. Also similar to FIG. 11A, in at least one embodiment, connector 160 is communicatively coupled to processing circuitry 140 (similar to earlier discussions, such processing circuitry may include sound processing circuitry). However, rather than being coupled to a microphone as in FIG. 11A, circuitry 140 is communicatively coupled to communications link 170. In the illustrated embodiment, module 110 also includes power source 150 (e.g., a battery).

Moreover, in one embodiment, at least a portion of the interior of module 110 resembles the embodiment of FIG. 11A with the addition of communications link 170 communicatively coupled to processing circuitry 140.

In various embodiments, the earpiece auditory device of the present invention overcomes the difficulties associated with prior earpiece auditory devices.

With regards to the problem of bulkiness and noticeability of earlier prior art auditory devices, as previously mentioned, when in use, preferably completely-in-canal unit 10 is positioned so deep inside the ear canal of a user as to touch the bony portion of the user's hearing canal. Accordingly, the unit is indiscernible to an observer. In addition, in one embodiment, fastener 31 and module 33 are of a particular size and shape such that, when placed behind the cartilage of the ear of a user, fastener 31 and module 33 are made invisible to an observer by the cartilage of the user's ear. Also as mentioned, in one embodiment, the dimensions of connector 20 are such that those portions of connector 20 not in the bony or outer portion of the user's ear canal or behind the user's ear when device 40 is in use are taut against the head of the user. Furthermore, in at least some of these embodiments, the dimensions of connector 20 are such that connector 20 is indiscernible to one casually viewing the user. Accordingly, in one embodiment, when device 40 is in use, its presence will be indiscernible to the casual observer. Therefore, the earlier problems of bulkiness and noticeability are reduced, if not alleviated, by the present invention.

With respect to the occlusion dilemma discussed earlier, because, in one embodiment, completely-in-canal unit 10 is inserted so deep in the user's ear canal as to touch the bony portion, the device does not cause the patient to experience the occlusion effect. Therefore, embodiments of the present invention reduce the occlusion effect without having to resort to vents, open mold configurations, etc. (although vents, open molds, etc., may still be used for other purposes).

Similarly, with regards to the feedback problems occurring with some prior art auditory devices (e.g., conventional hearing aids), in some embodiments, the microphone(s) of device 40 (or equivalent device(s)) is mechanically isolated from the speaker(s) of device 40. Therefore, electroacoustic feedback is, at the very least, greatly reduced.

Accordingly, various embodiments of the present invention enable a user to have the benefit of a high-gain earpiece auditory device without the accompanying detriment of suffering from the occlusion effect.

In addition to the above, in some embodiments, at least portions of the earpiece auditory device are protected from one or more undesirable external elements (such as moisture, cerumen, dirt, etc.) to which certain prior art devices are susceptible.

Moreover, in one embodiment, the couplings of the earpiece auditory device do not require significant space in order to be implemented. Accordingly, significant device space and/or other limited space in around the user's ear need not be taken up by the couplings of embodiments of the present invention.

Furthermore, in one embodiment, the coupling(s) between the connector, the behind the ear component, and the completely-in-canal component is of sufficient strength that the completely-in-canal unit and behind-the-ear unit may be removed from the user's ear by pulling on the connector without any undesirable separation of the components.

Moreover, as mentioned earlier, in a preferred embodiment, one or more portions of the earpiece auditory device may be assembled with relative ease. As a result, in one embodiment, an earpiece auditory device in accordance with the present invention may be mass produced, while at the same time provide a tailored fit to one or more users.

For example, rather than waiting until a particular customer has been fitted, tested, etc., to manufacture an auditory device for that customer, the manufacturer(s) of at least one embodiment of an earpiece auditory device of the present invention may instead make available one or more mass produced components (and/or elements thereof) of an embodiment(s) of the earpiece auditory device. The user, or other individual, may then select from the above described components, elements, etc,. those components, elements, etc., that provide the fit and functional capabilities desired by the user. The user, or other individual, may then assemble the device himself/herself.

To illustrate, the manufacturer(s) may make available a plurality of behind-the-ear units from which a behind-the-ear unit operable to facilitate a particular user's intended use for an earpiece auditory device may be selected. This plurality of behind-the-ear units may include units of different types, shapes, sizes (e.g., so that a user may select a behind-the-ear unit that is of a particular size so that the unit is made invisible by the user's ear when placed behind the user's ear), functional capabilities (e.g., two or more of the behind-the-ear units may have different sound processing circuitry), etc. However, two or more of the behind-the-ear units may be of the same type, shape, size, functional capability, etc.

The manufacturer(s) preferably may also make available a plurality of one or more elements of a completely-in-canal unit (e.g., a plurality of ear molds and/or a plurality of speakers) and/or a plurality of completely-in-canal units, from which a user, or other individual, may select at least one of the elements to be included in the completely-in-canal unit of the user's device. Similar to the earlier discussion, the plurality of one or more elements includes elements of different, types, shapes, sizes (e.g., multiple pre-made sizes of ear molds), functional capabilities (e.g., the plurality of one or more elements may include two or more speakers having different speaker performance characteristics), etc. However, similar to the above discussion, in one embodiment, two or more of the earlier mentioned plurality may be of the same type, shape, size, functional capability, etc. In one embodiment, the earlier mentioned plurality may include universal-fit tips, such as the foam tips, slips, boots, etc., described earlier, to provide a desired fit for the user. Furthermore, custom-made ear molds may be included as well.

In addition, in one embodiment, the manufacturer(s) may also make available a plurality of connectors from which a user may select a connector to couple (physically and/or communicatively) the selected behind-the-ear unit to a selected completely-in-canal component or the completely-in-canal unit that includes the one or more selected elements. In a preferred embodiment, at least one of the connectors includes at least one end operable to detachably couple (physically and/or communicatively) the connector to the selected behind-the-ear unit or completely-in-canal unit. Similar to the above discussions, the plurality of connectors may be of different types, sizes (e.g., different lengths), shapes, functional capabilities, etc. Moreover, two or more of the plurality of connectors may be of the same type, size, shape, functional capability, etc. Preferably, from the plurality of connectors, the user may select a connector of sufficient length to couple the selected behind-the-ear component, when placed behind the ear of the particular user, to the completely-in-canal unit, when placed inside the ear canal of the particular user so deep as to touch the bony portion of the user's ear canal. In another embodiment, preferably the user may select a connector of such dimensions that when in use, those portions of the connector not in the bony or outer portion of the user's ear canal or behind the user's ear are taut against the user's head.

The above, units, elements, etc., may be offered on an individual basis or in combination with other elements, sizes, shapes, etc. (e.g., one packet may contain an ear mold of a particular shape and size, while another packet may contain ear molds of various types, shapes and sizes, while yet another packet may contain a particular length of connector, and still another packet may contain a speaker and a connector already coupled together).

As discussed earlier, the user, or other individual, may then assemble the selected pieces together to form an earpiece auditory device fitting the user's ear structure, as well as the user's intended use for the device. Accordingly, a distributor, dispenser, or even the user himself/herself, may make the initial assembly of the device, instead of the manufacturer. In addition, in one embodiment, the distributor, dispenser, user, etc., may tailor the device to fit the particular user's ear structure, as well as the user's intended use for the device, by determining which combination of the pre-made elements, sizes, shapes, etc., provides an optimal fit and operation for the particular user.

Moreover, not only is assembly made more convenient, but disassembly, re-assembly, repair, fitting, re-fitting, etc., is made convenient as well. Preferably, as a result, the device may be repaired, etc., without the need to send the device to a repair lab or return the device to the manufacturer, thereby saving the user from the earlier described hassle associated with sending the device to the manufacturer. The same holds true with refitting the device to a particular user if the initial fit was deficient in some manner. In such instances, the distributor/dispenser and/or the user may simply experiment with the various pre-made sizes until the optimal fit for the user is found.

Thus, preferably the present invention saves time and money for the user(s), the manufacturer(s), and/or the distributor(s)/dispenser(s). However, the manufacturer may still initially assemble the auditory devices and then make the other pre-made components commercially available for repair or replacement purposes.

Another notable advantage is that, in various embodiments, the earpiece auditory device discussed above may be used in a variety of applications. For example, embodiments of the earpiece auditory device may be used in a manner similar to conventional hearing aids.

In addition, embodiments of the earpiece auditory device may be used as earphones (or similar device(s)) for such electronic devices as televisions, radios, CD players, stereos, cell phones, computers (to include personal digital assistants and other processor based devices). As mentioned, in one embodiment, the earpiece auditory device may receive transmissions from and/or broadcast transmissions to a remote device(s) by wired or wireless means (e.g., radio frequency (RF) means, optical means, magnetic induction coil, etc.).

Moreover, in at least some embodiment(s), the earpiece auditory device may receive and/or broadcast data or other transmissions (be it via wired or wireless means) to a remote device (e.g., audio files, MP3 files, voice streams, video streams, Internet broadcasts, audio e-mails, etc). The device may be complaint with the various transmission formats, protocols (to include TCP/IP, Bluetooth, etc.), and interfaces necessary to receive and/or process such transmissions.

Embodiments of the earpiece auditory device of the present invention may also be used as monitors for recordings. For example, a musician, or other individual recording sounds, may hear sounds as they are being processed by studio equipment through an embodiment of the present inventions.

In addition, embodiments of the earpiece auditory device may be used as IFB devices, e.g., for newscasters, whereby audio may be provided to the newscaster.

Also, as mentioned, in addition to manipulating sound in the manner described above, embodiments of the earpiece auditory device of the present invention may be used to decrease, muffle, or eliminate certain sounds. For example, as discussed earlier, at least one embodiment, the earpiece auditory device of the present invention, may be used as an electronic ear plug.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiment of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or alter to be developed that perform substantially the same function or achieve substantially the same result as the corresponding embodiments described herein may be utilized according to steps.

What is claimed is:

1. A modular system for assembling an earpiece auditory device tailored to a user, the system comprising:
   a plurality of behind-the-ear components from which a behind-the-ear component may be selected, wherein each of the behind-the-ear components comprises a module including processing circuitry including a communications port operable to communicate with an external device; and
   a plurality of connectors from which a connector of sufficient length may be selected to physically couple a selected behind-the-ear component, when the selected behind-the-ear component is placed behind the ear of the user, to a in-canal component when the in-canal component is placed inside the ear canal of the user, wherein the in-canal component provides substantial attenuation of ambient sounds in the ear canal of the user and includes a speaker, and at least a portion of the connector of sufficient length is sufficiently rigid so as to allow the connector of sufficient length to be used to insert and remove the in-canal component from the ear canal of the user.

2. The modular system of claim 1 wherein the selected behind the ear component is chosen based on an intended application for the earpiece auditory device.

3. The modular system of claim 2 wherein the intended application is one of a broadcast reception application, a media playback application, or a communications application.

4. The modular system of claim 2 wherein the communications port of each of the plurality of behind-the-ear devices is selected for the intended application.

5. The modular system of claim 4 wherein the communications port is one of a wireless port, or a wired port.

6. The modular system of claim 1 further comprising a plurality of ear molds of varying sizes connectable to the in-canal component, from which a selected ear mold can be chosen, the selected ear mold chosen to fit the user's ear canal.

* * * * *

(12) INTER PARTES REEXAMINATION CERTIFICATE (1289th)
United States Patent
Feeley et al.

(10) Number: US 7,606,382 C1
(45) Certificate Issued: Jun. 24, 2016

(54) BTE/CIC AUDITORY DEVICE AND MODULAR CONNECTOR SYSTEM THEREFOR

(75) Inventors: Jim Feeley, Bixby, OK (US); Mike Feeley, Tulsa, OK (US)

(73) Assignee: HEAR-WEAR TECHNOLOGIES, LLC, Tulsa, OK (US)

Reexamination Request:
No. 95/001,388, Jul. 1, 2010

Reexamination Certificate for:
Patent No.: 7,606,382
Issued: Oct. 20, 2009
Appl. No.: 11/601,057
Filed: Nov. 17, 2006

Related U.S. Application Data

(63) Continuation of application No. 09/927,891, filed on Aug. 10, 2001, now Pat. No. 7,139,404.

(51) Int. Cl.
*H04R 25/00* (2006.01)
(52) U.S. Cl.
CPC ...................................... *H04R 25/00* (2013.01)

(58) Field of Classification Search
None
See application file for complete search history.

(56) References Cited

To view the complete listing of prior art documents cited during the proceeding for Reexamination Control Number 95/001,388, please refer to the USPTO's public Patent Application Information Retrieval (PAIR) system under the Display References tab.

*Primary Examiner* — My-Trang Ton

(57) ABSTRACT

An earpiece auditory device is described which includes a behind-the-ear component shaped to fit behind the ear of a user. The behind-the-ear component can also have at least one microphone and processing circuitry, where the processing-circuitry is used to processes audio signal from the microphone. The device also includes a speaker sized to fit in the ear canal of a user, and an ear mold holding the speaker in place. The ear mold can also be position to touch the bony portion of the ear canal and provide sound attenuation in the ear canal. A connector physically and electrically connects the behind-the-ear component to the speaker. The connector is capable of being used to insert and remove the speaker and ear mold from the ear canal of the user.

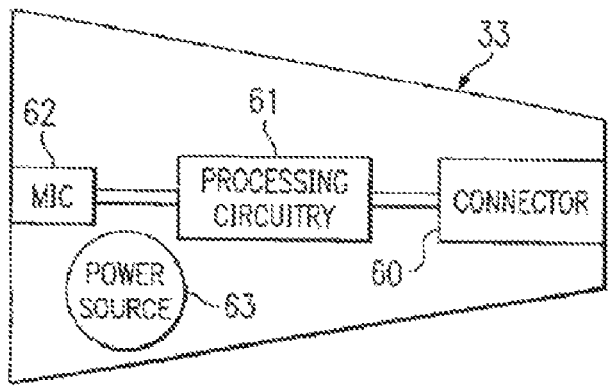

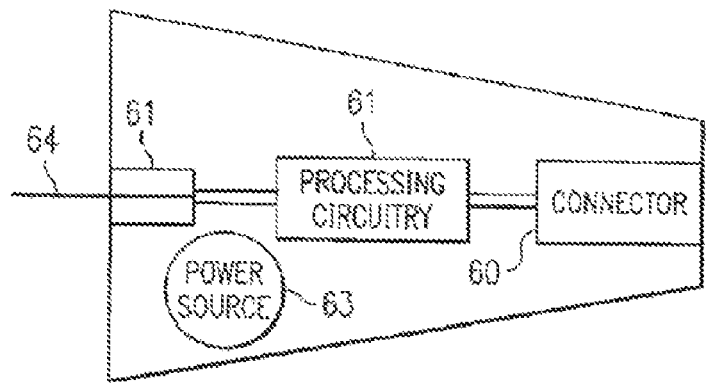

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *